United States Patent [19]

Bossard

[11] Patent Number: 4,986,626
[45] Date of Patent: Jan. 22, 1991

[54] OPTICAL FIBER TERMINATION MODULE

[75] Inventor: Ronald G. Bossard, Austin, Tex.

[73] Assignee: Minnesota Mining and Manufacturing Company, St. Paul, Minn.

[21] Appl. No.: 394,137

[22] Filed: Aug. 15, 1989

[51] Int. Cl.$^5$ .............................................. G02B 6/26
[52] U.S. Cl. ............................. 350/96.20; 350/96.21; 350/96.22
[58] Field of Search ................ 350/96.20, 96.21, 96.22

[56] References Cited

U.S. PATENT DOCUMENTS

| | | | |
|---|---|---|---|
| 3,989,567 | 11/1976 | Tardy | 156/158 |
| 4,050,783 | 9/1977 | Tardy | 350/96 C |
| 4,585,303 | 4/1986 | Pinsard et al. | 350/96.20 |
| 4,684,210 | 8/1987 | Matsunaga et al. | 350/96.21 X |
| 4,770,357 | 9/1988 | Sander et al. | 350/96.21 X |
| 4,824,196 | 4/1989 | Bylander | 350/96.21 X |

FOREIGN PATENT DOCUMENTS 0101970  8/1983  European Pat. Off. ......... 350/96.20

Primary Examiner—William L. Sikes
Assistant Examiner—Phan T. Heartney
Attorney, Agent, or Firm—Donald M. Sell; Walter N. Kirn; John C. Barnes

[57] ABSTRACT

An optical fiber termination for the termination of fibers at a residence, apartment or factory or office work station should be convenient and readily accomplished by the technician. The termination is afforded by a module including a support having a wall to support a connector, a plug and short pigtail fiber reaching the center of a splice in a splice magazine on the support.

12 Claims, 3 Drawing Sheets

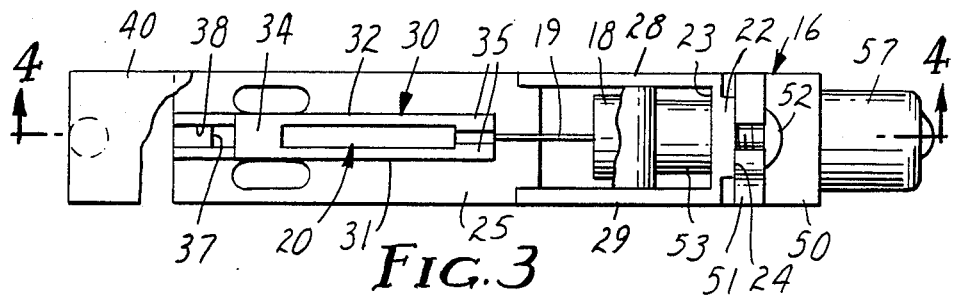
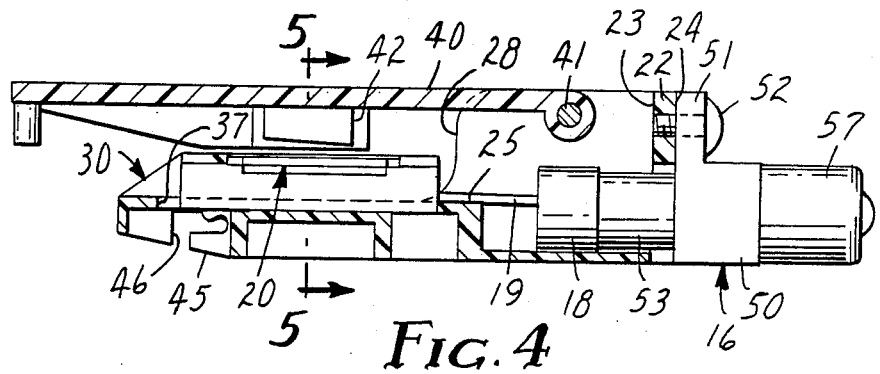
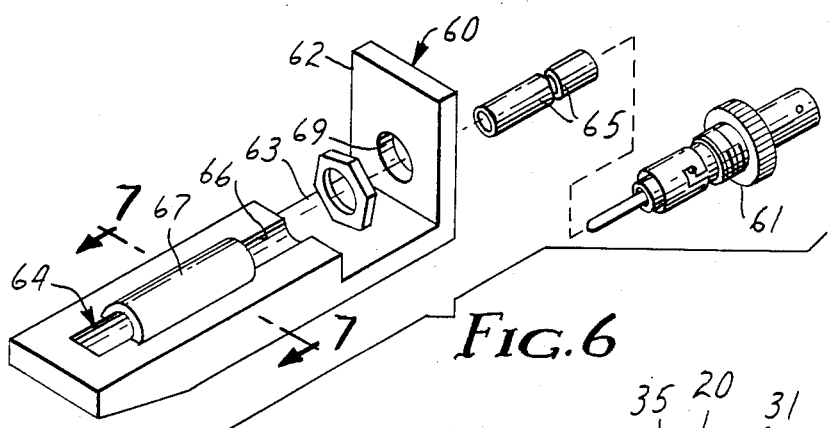
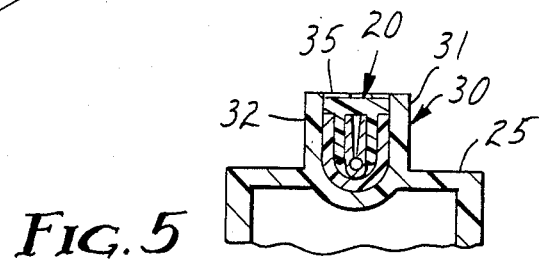

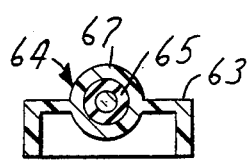
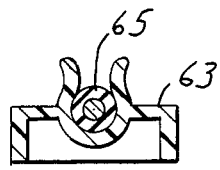
Fig. 7    Fig. 8
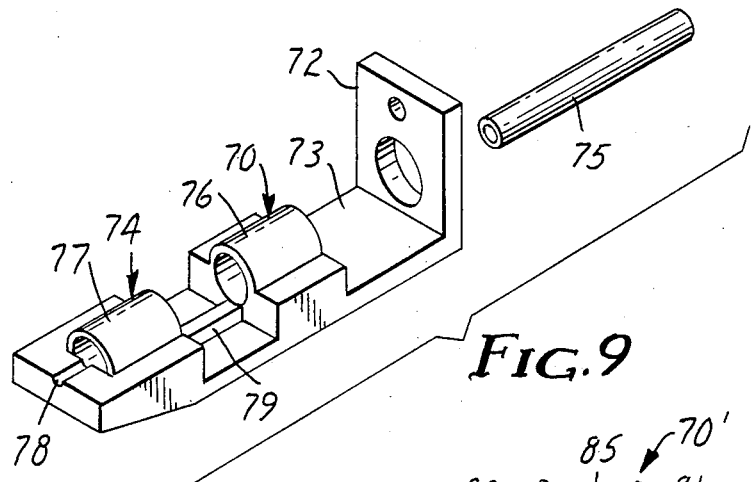
Fig. 9
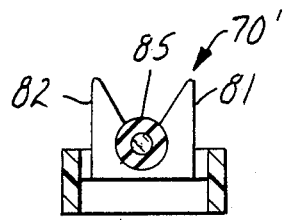
Fig. 10
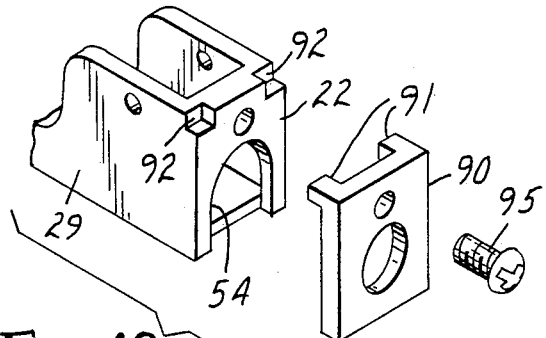
Fig. 12
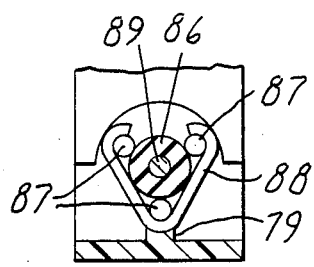
Fig. 11

OPTICAL FIBER TERMINATION MODULE

BACKGROUND OF THE INVENTION

1. Field of the Invention

The present invention relates terminating an optical fiber of a cable, and in one aspect to a device for terminating an optical fiber and adapting it to be readily connected to another fiber, i.e. a distribution fiber.

2. Description of the Prior Art

The prior art has a variety of connector and splice structures for affording the connection of an end of one optical fiber to the end of another optical fiber for the purpose of joining the two suitably to continue the light through the fibers. The splice is a device which can be applied by a skilled technician in the field who cleaves the fiber, abuts two fiber ends and joins them permanently together by a splice. The connector comprises a connector plug, coupling and connector plug to form the continuation for the light and each connector plug has the end of a length of optical fiber carefully aligned in and secured to the plug in an assembly plant or as a field operation requiring special equipment and great care to terminate the fiber precisely. This plug and fiber end may then be readily connected to the end of another fiber which is joined to a connector plug in a connector coupling by almost anyone with minimal assembly skills. The technicians then are the workers with the responsibility of taking the optical fiber cable that has arrived at the communications station and then take the individual optical fibers and splice each of them to fibers leading from connector plugs such that they can be subsequently connected to the connector plug of a fiber running to an opto-electronic piece of equipment. When this piece of equipment is a piece of equipment in the home, factory or office work station and the number of optical fibers directed thereto are all contained in a single cable, or the cable contains optical fibers together with copper signal wires, it is desirable to have a convenient means of termination of the optical fibers as well as a convenient method of joining the copper wire to a distribution wire. This termination should not require any more skill than the technician that would routinely service and install such cables. If it requires tools that cut and polish the optical fiber end and special fixtures to secure the finished fiber end in a plug, then the level of skill required to make only several connections at remote locations is not economically prudent commercially, and the optical fiber distribution system will not grow and be as readily available to as many citizens as rapidly as desired. Presently, where large installations are made in a building or central station, a distribution housing is installed and the cable is brought in for distribution. Individual optical fibers from the cable are spliced to long pigtails, each consisting of individually jacketed optical fiber terminated into a connector plug at one end. The pigtail connector plug is mounted into a connector coupling located within the distribution housing or a remote second distribution housing. The splice joining the two fibers is placed within a splice holder within the first distribution housing. The surplus fiber from the pigtail and surplus fiber from the cable are both carefully stored in the distribution housing. A second plug mates with the first in the connector coupling and routes to an opto-electronic device or other intermediate junction. This is the routine which must be followed to allow slack for removal of the fiber from the distribution housing for application of a plug, either as a precise field cut and polish operation or through splicing of a factory made plug with a fiber pigtail.

A prior device, identified as an optical cable header is described in U.S. Pat. No. 4,585,303, utilizes a plurality of optical connector supports which are engaged in a magazine or housing. The connector supports have an elongate body in the form of a hollow finger. The finger has a cylindrical connector member at a front end, to receive the connection end fitting on the end of each incoming fiber, and a side mounted former, upon which to wind a length of fiber, is located near to its opposite or rear end. The magazine has a row of cavities which are open at the rear of the magazine for receiving the supports. The cavities have circular openings in the front wall to receive the connector members of the connector supports when they are received in the cavities. The optical connector will also receive an analogous end fitting of an external fiber for connection to the fiber inside the finger. The connector described in the introduction is an installed connection end fitting, for example the one described in French Pat. No. 2 275 787 and in its certificate of addition 2 316 611, the earliest patent corresponding generally to U.S. Pat. Nos. 3,989,567 and 4,050,783. The connector described in these patents is designed to receive one or multiple fibers, but to receive one fiber, requires an installation and in each end fitting, the end face of a fiber is rectified and suitably positioned for providing accurate optical connection when two connection fittings are brought together. The installation of the end fitting is not perceived as a field installation since Pat. No. 4,585,303 refers to the cable having a plurality of optical fibers with each fiber having a connection end fitting installed on its end. The purpose of the patented header is to avoid having to interrupt the connection of several fibers as with the connector of Pat. No. 4,050,783, when repairing a defect in the connection between any one pair of fibers.

The purpose of the present invention is to provide a module which allows splicing of a fiber to a connector plug pigtail within the module, thus eliminating the need for excess slack between the splice and plug, and between the splice and the balance of the feeder system as formerly required to remove the splice to a location suitable for the precise operation required.

Reliable mechanical splices of several designs have recently become available which make this splicing within the module possible.

It is therefore an object of this invention to provide a termination which will reduce the need for large or bulky boxes to handle incoming and distribution fibers and afford the installation of only one or a few optical fibers as needed, such as a small service tap into a residence, apartment or office or factory work station for connection of those optical fibers to opto-electronic equipment.

The module of the present invention should be easy to use to make the termination with incoming, unterminated fibers, so they are readily accessible to make connection with companion plugs on distribution cables.

SUMMARY OF THE INVENTION

The present invention provides a novel optical fiber termination module for use in terminating a cabled optical fiber. The module is particularly adapted to terminate the individual fibers in a cable and adapt them for ready attachment to a second optical fiber, such as present on a piece of equipment where signals thereto are transmitted by optical fiber, i.e. opto-electronic equipment of one kind or another. The module comprises an optical fiber connector coupling and a single connector plug connected to one end of a length of optical fiber and joined to the coupling, an optical fiber splice having opposite open ends for making connection between a second end of the length of optical fiber and the free end of an optical fiber from a cable, and support means for supporting the coupling and the splice. The support means comprising an end wall for supporting the connector coupling in fixed position thereon and a base joined to the end wall and extending in a direction away from the end wall. The base includes magazine means for supporting the splice in close spaced aligned relationship to the plug with said second end of the length of optical fiber positioned in the splice. The magazine is formed to permit entry of the cabled fiber to be terminated into the splice which is positioned in the magazine. The base is an elongate narrow strip integral with the end wall and magazine. The end wall has an opening for receiving one end of the coupling and mounting means for affixing the coupling to the end wall. The mounting means is in the form of an adapter or hole for receiving a fastener if the coupling has a mounting bracket. The magazine means comprises a cradle to receive the splice in axial alignment with the plug and the short length of optical fiber.

In a presently preferred embodiment the module includes a cover hinged in relationship to the base to be positioned over the splice. The cover can be provided with a projection intermediate its length so the cover serves as a lever to close the splice and place the end of the length of fiber and the end of the terminated fiber in aligned relationship.

BRIEF DESCRIPTION OF THE DRAWING

The present invention will be further described with reference to the accompanying drawing wherein:

FIG. 3 is a plan view of the module, with the cover broken away to show the structure below;

FIG. 4 is a longitudinal sectional view taken along the line 4—4 of FIG. 3;

FIG. 5 is a fragmentary vertical sectional view taken along line 5—5 of FIG. 4;

FIG. 6 is a perspective view of a second embodiment of a module frame and a splice;

FIG. 7 is a fragmentary vertical sectional view taken along line 7—7 of FIG. 6;

FIG. 8 is an alternative fragmentary vertical sectional view of another embodiment;

FIG. 9 is a perspective view of a fourth embodiment of a module frame and a splice;

FIG. 10 is a vertical sectional view showing a modification of the splice magazine of FIG. 9;

FIG. 11 is a fragmentary vertical cross section of a splice magazine illustrating a different splice configuration; and FIG. 12 is a fragmentary exploded perspective view of an adapter for the frame of FIG. 1 to permit the frame to accommodate other connectors.

DESCRIPTION OF THE PRESENTLY PREFERRED EMBODIMENTS

Figure 1:
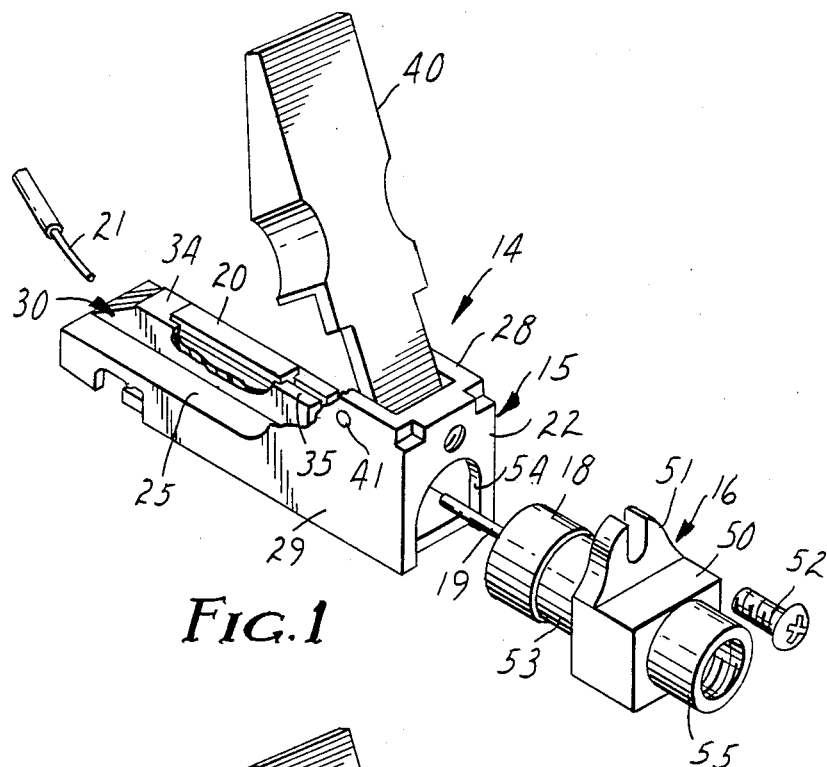
FIG. 1 is a perspective view of a module with several of the parts shown in exploded perspective position.

The optical fiber termination module of the present invention will be described with reference to the accompanying drawings wherein like parts are identified by the same reference numeral throughout the several views.

Figure 2:
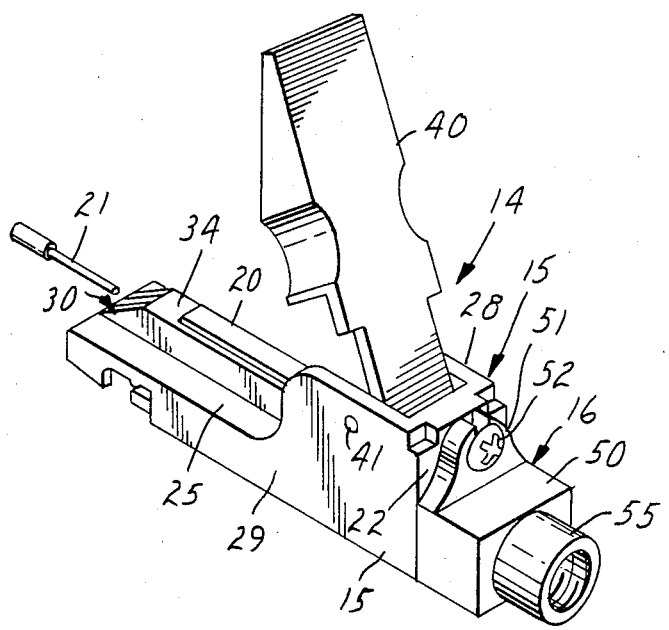
FIG. 2 is a perspective view of the module of FIG. 1 with an optical fiber coupler connected to the frame.

The module 14 illustrated in FIGS. 1-5 comprises a small frame or support 15, an optical fiber connector coupling 16, a single connector plug 18 connected to one end of a short length 19 of optical fiber and joined to one end of the coupling 16, an optical fiber splice 20 having opposite open ends for making connection between a second end of the length 19 of optical fiber and the free end of an optical fiber from a cable, illustrated at 21.

The frame or support means 15 for supporting the coupling 16 and the splice 20 in rigid alignment, comprises an end wall 22 having four sides and two faces 23 and 24, and an opening therethrough for supporting the connector coupling 16 in fixed position thereon and a base 25. The base 25 is a narrow elongate strip molded integrally with and joined to one side of the end wall and the base extends in a direction away from the face 23 of the end wall 22. The frame or support means illustrated also includes a pair of side walls 28 and 29, and means defining a magazine 30 for supporting the splice 20 in close spaced relationship to the end wall 22, allowing space for connection of the plug 18 into the coupling 16. The coupling 16 and plug 18 illustrated is a bay receptacle and a biconic plug respectively, such as manufactured by 3M Fiber Optics Products, Inc. of Eatontown, N.J. 07724.

The magazine 30 is shaped to receive the splice and to hold the same in a position in substantially rigid coaxial alignment with the plug 18 to receive, in the splice 20 to a position approximately half the length of the splice, the second or free end of the length 19 of optical fiber fixed in the plug 18. The fiber 19 extends in an essentially straight line between the plug 18 and the splice 20. This length of fiber 19 preferably is between 0.5 to 12 inches (1.27 cm to 30.5 cm) in length and with presently known mechanical splices and connectors, as illustrated, is between 1.5 to 2.5 inches (3.8 to 6.35 cm). The magazine 30 has wall members to receive and support the splice in a position to permit the splicing of an incoming fiber with the length of fiber 19. In FIGS. 3, 4 and 5 the magazine 30 is shown as a channel shaped member, shaped to fit the shape of the splice 20 placed therein.

In the illustrated magazine 30 a splice according to U.S. Pat. No. 4,818,055, issued Apr. 4, 1989, is placed between the walls 31 and 32 forming a U-shaped recess. The recess is closed at the top adjacent the ends to secure the splice 20 therein and restrict displacement of the splice prior to splicing the second fiber since the splice is not secured to the optical fiber 19 and the splice 20 could be removed. The end walls 34 and 35, which cover the recess, note wall 35 which is formed of two walls projecting toward each other but spaced to afford initial entry of the splice into the magazine by flexing the walls of the magazine, restrict the splice from being removed from the top of the magazine. The presence of the fiber 19 in the splice and a wall 37 defining stop means at the rear of the magazine 30 limits movement of the splice 20 endwise. An opening 38 in the rear of the magazine permits the entry of the optical fiber 21 to be terminated into the splice 20 positioned in the magazine 30. The axis in the metal fiber aligning element of the splice 20, of the fiber 19 and the plug 18 are not precisely axially aligned to permit the fiber 19 to flex slightly when the optical fiber 21 is placed in the splice, thus indicating that the fiber ends are contacting and the beam strength of the optical fiber 19 does not have to be overcome before this slight bending or flexing can take place. At this point the splicing is completed by closing the cover of the splice 20 into the body to urge the aligning element closed on the fiber ends.

In a preferred embodiment the module 14 includes a cover 40 hinged, about a pivot axis 41 through the side walls 28, 29, in relationship to the base 25 to be positioned over the splice. The cover 40 can be provided with a projection 42 intermediate its length so the cover 40 serves as a lever to close the splice cover and place the end of the length 19 of fiber and the end of the terminated fiber 21 in fixed aligned relationship. Also in the illustrated embodiment the base is provided with an inclined trailing edge as indicated at 45 and a notch 46 is formed adjacent the inclined edge to afford means to support the module and to afford pivotal movement of the module to allow the end wall 22 to be raised above the normal plane of the base.

The coupling 16 comprises a rectangular housing 50 from which extends a coplanar mounting flange 51 having a slotted aperture to receive a fastener 52 and a first cylindrical projection 53 which is internally threaded to receive the connector plug 18. The end wall 22 has an opening 54 which receives the coupling projection 53 in axial alignment with splice 20 and a second threaded opening in the end wall 22 to receive the fastener 52 and thus suitably mount the coupling 16 to the end wall. A second cylindrical threaded projection 55 is positioned for receiving the plug on the end of a cable extending from a piece of opto-electronic equipment. A removable cap 57 is preferably placed over the projection 55 to limit dust or other material from entering the cavity of the coupling and covering the end of the fiber 19 when the module is not in use.

FIG. 5 illustrates the splice 20 in the magazine 30 with the U-shaped cross-section of the channel conforming to the outer peripheral configuration of the splice. The splice has an inner element which forms a channel to receive the ends of the optical fibers and upon the cover of the splice being forced into the body thereof, the element aligns the ends of the fibers axially by embedding the fibers into the element.

Referring now to FIG. 6 there is illustrated a second embodiment of the module of the present invention. In this embodiment the frame or support member 60 has an end wall 62 from one face of which projects a base 63 formed integrally therewith. The base 63 includes a magazine 64 for supporting a splice 65. The magazine 64 is formed by a shallow trough 66 which is open on one end and closed at the end spaced from the end wall to define stop means to limit the travel of the splice 65. A cupola 67 is positioned over the center portion of the trough to retain the splice therein. The trough is shallow enough to permit the center of the splice 65 and the fiber entry opening therein to be above the wall closing the end of the trough spaced from the end wall 62. The splice is positioned in the magazine by placing the same through an opening 69 in the end wall 62. The fiber of the connector plug is then placed in the splice. Then the coupling is mounted on the end wall. The connector plug and coupling illustrated are ST type and the threaded coupling 61 is formed with a cylindrical projection which fits through the opening 69 which projection is externally threaded to receive a nut which is threaded thereon up to the end wall 62 to hold it in place with a collar against the opposite side of the wall. The projection is then internally threaded to receive a plug having a fiber pigtail fitting into one end of the splice 65.

FIG. 7 illustrates a cross-section of the magazine of FIG. 6 with the splice 65 therein.

FIG. 8 illustrates as alternate cross-section wherein the magazine is formed of a material which is sufficiently flexible such that the a cupola can have an open central portion to allow the splice to be forced into the magazine from above the trough instead of endwise.

Referring to the embodiment of FIG. 9 there is illustrated a module having a frame or support member 70 comprising an end wall 72, from one face of which projects a base 73 formed integrally therewith. The base 73 includes a magazine 74 for supporting a splice 75. The magazine 74 is formed by two spaced cylindrical sections 76 and 77. The section 76 is spaced from the end wall 72 sufficiently to permit the placement of the plug and coupling therebetween and the section 77 is positioned coaxially therewith and spaced therefrom sufficiently to expose the central portion of the splice 75. The section 77 is closed partially at the end opposite the end wall 72 to afford stop means to limit the movement of the splice 75. A groove 78 is formed in the magazine to permit the fiber 21 from a cable to be inserted into the splice 75. A support bar 79 is formed between the sections to support the lower central portion of the splice 75. Splice 75 is cylindrical and of the type that is opened to receive an optical fiber when the center portion is squeezed. The splice 75 is positioned in the magazine by placing the same through an opening in the end wall 72. Then the coupling is mounted on the end wall. The coupling, not shown, may be formed according to either type of coupling previously described.

The embodiment illustrated in FIG. 10 is similar to that described for FIG. 9 except in the space between the cylindrical sections, or as a substitute for the cylindrical sections in this module support 70', a pair of bars 81 and 82 are positioned on either side of a cylindrical or semi-cylindrical trough. The bars 81 and 82 are formed to be flexible to permit the upper ends thereof to be urged toward one another sufficiently to apply an opening force on a splice 85 positioned within the magazine. Release of the ends allows the splice to then close on the ends of fibers disposed therein when the splice was opened, to align the fibers.

FIG. 11 is a transverse cross section of a magazine similar to the magazine of FIG. 9 with a splice 86 therein which comprises three rods 87 extending parallelly within a compression spring member 88 for squeezing the rods against the optical fiber ends 89 and aligning the same axially.

FIG. 12 discloses an adapter plate 90 which is adapted to fit on the end wall 22 of a module 14. The adapter plate 90 is a thin plate-like member with two projections 91 at adjacent upper corners to fit in recesses 92 in the end wall 22. The plate 90 has an opening to receive a threaded projection from a coupling and an opening to receive a fastening member 95. The adapter plate 90 thus permits a module 14 to receive different types of couplers. One such coupler is the ST type referred to earlier, others are the D4 type, SMA type and FC type.

Having thus described the present invention for a module for the termination of optical fibers, which module has an end wall to support a connector and a close-spaced magazine to support a splice, which splice has the fiber leading to the connector positioned therein, by a technician at the termination site, which termination provides a connector for the connection to the opto-electronic equipment at the termination site, it will be appreciated that modifications may be made without departing from the spirit or scope of the present invention as defined by the appended claims.

I claim:

1. An optical fiber termination module for use in terminating a cabled optical fiber to a connector comprising:

an optical fiber connector coupling and a single connector plug connected to one end of a length of optical fiber and joined to said coupling.

an optical fiber splice having opposite open ends for making connection between a second end of said length of optical fiber and the free end of an optical fiber from a cable, and support means for supporting said coupling and said splice in juxtaposition, said support means comprising an end wall for supporting said coupling in fixed position thereon and a base joined directly to said end wall and extending away from the end wall, said base including magazine means for supporting said splice in close spaced generally axial alignment with said coupling with said second end of said length of optical fiber in said splice.

2. An optical fiber termination module according to claim 1 wherein said base is an elongate narrow strip integrally molded with said end wall and said length of optical fiber extends straight from said plug to said splice, and said elongate strip has a length greater than the length of said length of optical fiber.

3. An optical fiber termination module according to claim 2 wherein said end wall has an opening for receiving one end of said coupling and mounting means for affixing said coupling to said end wall.

4. An optical fiber termination module according to claim 2 wherein said magazine means comprises a cradle to receive said splice, said cradle having side walls and at lest one end wall, said side walls being positioned in substantially parallel relationship with the axis of said plug and said length of optical fiber.

5. An optical fiber termination module according to claim 1 wherein said base is an elongate narrow strip having a top surface supporting said magazine means and said magazine means comprises spaced wall members and a connecting base defining a U-shaped cradle for the splice and said wall members are joined at the tops thereof to restrict the splice from being separated from the magazine means.

6. An optical fiber termination module according to claim 1 wherein said base is an elongate narrow strip having a top surface supporting said magazine means and said magazine means comprises a shallow semicylindrical trough with an arcuate wall covering at least a portion of the trough to restrict the splice from being separated from the magazine means.

7. An optical fiber termination module according to claim 1 wherein said magazine means is an elongate narrow strip having a top surface supporting said magazine means and said magazine means comprises a cylindrical support extending lengthwise of the surface and the support has a portion of the middle thereof exposed to allow access to the splice.

8. An optical fiber termination module according to claim 7 wherein said magazine means includes means positioned adjacent the middle thereof for aiding in the actuation of said splice.

9. An optical fiber termination module according to claim 1 wherein said magazine means comprises a cradle for supporting said splice which has a shape to receive the splice and contact it about a majority of its perimeter and said cradle being sufficiently long to allow some axial movement of the splice upon making a connection therein.

10. An optical fiber termination module according to claim 1 wherein said end wall has an aperture therein for receiving said coupling, said coupling having an opening therethrough defining an axis which is located parallel to said base, said plug being received in said opening of said coupling at one end and said length of optical fiber extending therefrom to said magazine means and into said splice positioned in said magazine means, and said magazine means including means for directing an optical fiber from a said cable into said splice whereby it can abut against said second end of said length of optical fiber.

11. An optical fiber termination module according to claim 10 wherein said support means includes a cover mounted thereon, pivot means for affording pivotal movement of the cover about an axis transverse to said base for movement of said cover toward and away from said base to cover said plug and magazine means.

12. An optical fiber termination module according to claim 11 wherein said cover includes projection means for actuation of a splice in said magazine means upon movement thereof toward said base.

* * * * *